A. J. ROWLEDGE.
VARIABLE SPEED GEAR.
APPLICATION FILED JULY 11, 1916.

1,256,373.

Patented Feb. 12, 1918.
3 SHEETS—SHEET 1.

Inventor:
Arthur J. Rowledge
by Foster Freeman Watson Hoit
Attys

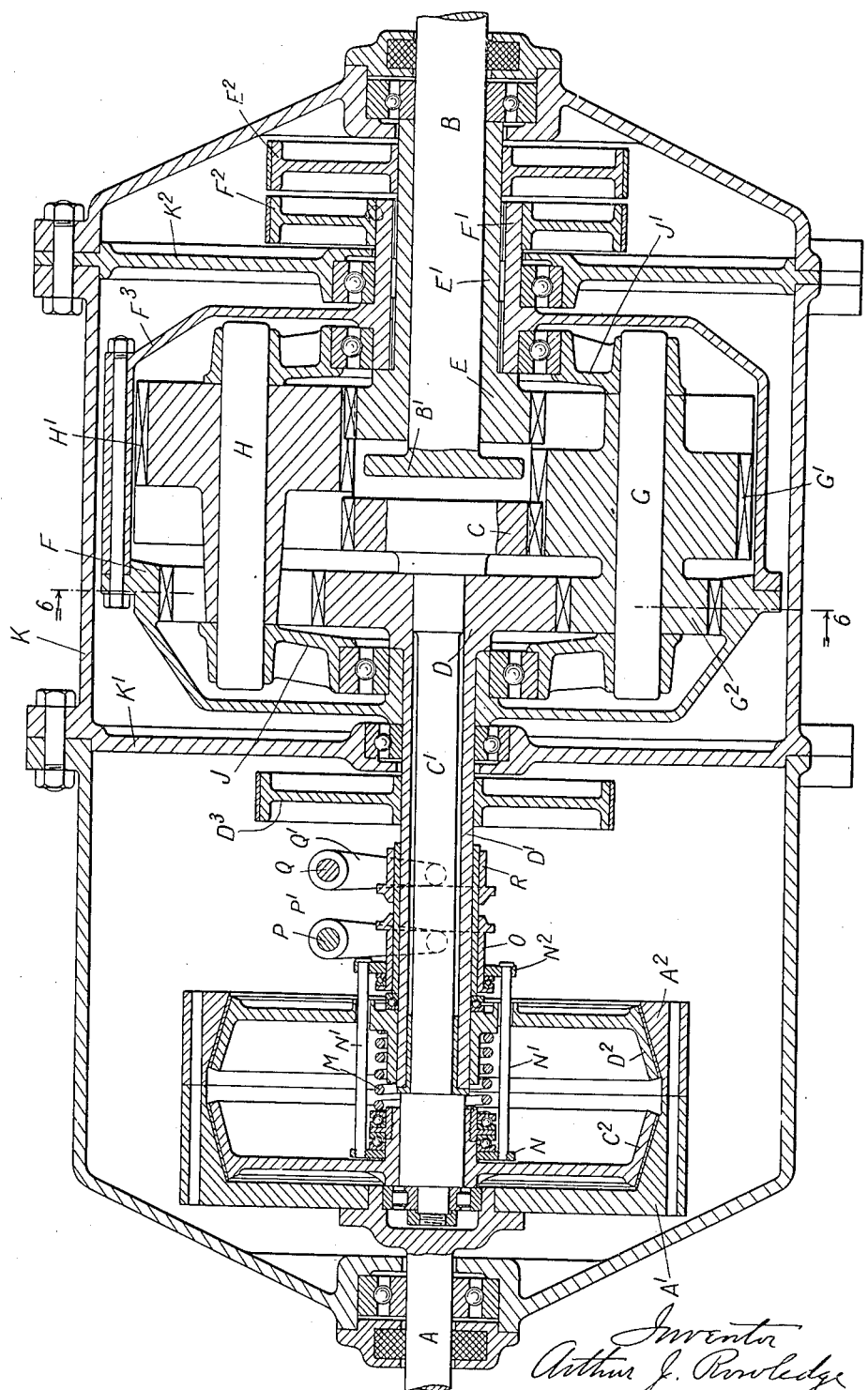

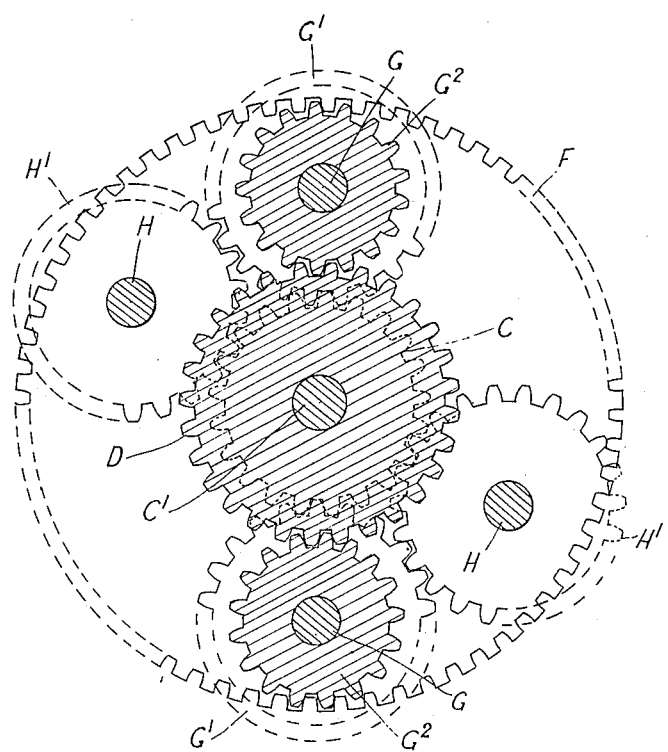

UNITED STATES PATENT OFFICE.

ARTHUR JOHN ROWLEDGE, OF LONDON, ENGLAND, ASSIGNOR TO D. NAPIER & SON LIMITED, OF LONDON, ENGLAND.

VARIABLE-SPEED GEAR.

1,256,373.   Specification of Letters Patent.   Patented Feb. 12, 1918.

Application filed July 11, 1916. Serial No. 108,745.

*To all whom it may concern:*

Be it known that I, ARTHUR JOHN ROWLEDGE, a subject of the King of England, residing at London, in England, have invented certain new and useful Improvements in Variable-Speed Gears, of which the following is a specification.

This invention relates to variable speed gear of the spur wheel epicyclic type in which the speed variations are effected by means of clutches and brakes which are operative on certain members of the gear and has for its object to provide a simple form of such gear which will enable four and in some cases five speeds to be obtained in the forward direction and a reverse.

According to this invention the driving and driven shafts are disposed coaxially and to the driven shaft are connected two planetary members so arranged that one wheel of one planetary member gears with the other wheel of the other member. A set of separate wheels acting as sun wheels of which one may be in the form of an internally toothed ring are all mounted coaxially with but separate from the driving and driven shafts some of these wheels gearing with the wheels of one planetary member and some of them gearing with the other planetary member. Two clutches and three brakes so control the several sun wheels by imparting rotation through the clutches and by locking certain of them by the brakes that power will be transmitted through the planetary members with a differential action through the driven shaft and the latter can be driven at the desired predetermined speeds.

It will be understood that while the employment of two planetary members is particularly indicated one or both of these members may be duplicated for convenience and balancing purposes.

Each planetary member preferably comprises two integral spur wheels but in some cases one planetary member may be composed of two such wheels while the other member is formed of a single spur wheel. The total number of wheels in the two essential planetary members may thus be three or four. Where the planetary member is composed of two wheels these are of different sizes and the wheel or wheels composing one planetary member may differ in size from the wheels composing the other planetary member. In some cases however, where each planetary member is composed of two integral wheels the sizes of these wheels in one planetary member may be similar to the sizes of the wheels in the other planetary member. In each form of the gear it is the two larger wheels in the planetary members which gear together or where one member is composed of a single wheel only this gears with the larger wheel of the other planetary member.

The number of sun or equivalent wheels in the gear is four and they may be of either two, three or four different sizes. Thus in some cases these wheels may form one or two pairs of wheels but in other cases these wheels may all be of different sizes this difference in size having for its object the obtainment of certain desirable speed ratios.

Two of the sun or equivalent wheels are so arranged that by means of clutches they can be separately coupled to the driving shaft. One of these wheels which can be thus driven is also provided with a brake by means of which it can be held against rotation. The remaining two wheels are each provided with a brake by means of which they can be held against rotation.

The accompanying drawings illustrate by way of example several constructions of variable speed gear in accordance with this invention. For convenience and for the sake of clearness these drawings are to a considerable extent diagrammatic. In these drawings, Figure 1 is a longitudinal sectional elevation of one construction of a four or five speed gear in accordance with the present invention, electromagnetic clutches and brakes being shown as the means by which the variations in the speed are brought about.

Fig. 5 is a longitudinal sectional elevation of a modified form of four or five speed gear also arranged to be controlled by electromagnetic clutches and brakes.

Fig. 6 is a diagrammatic transverse section on the line 6—6 of Fig. 5 looking in the direction indicated by the arrows.

Like letters indicate like parts throughout the drawings.

In the construction illustrated in Figs. 1 to 4 inclusive which is arranged to provide four or if desired five speeds in the forward direction and a reverse the motor or driven shaft A has mounted upon it two clutch members A' A² which in this case are of the electromagntic type. Coaxially disposed with relation to the driving shaft A is the driven shaft B. A toothed wheel C is secured on one end of a shaft C' the other end of which carries a clutch member C² adapted to engage the driving clutch member A'. The shaft C' is disposed coaxially with the driving and driven shafts A and B and between the ends of these two shafts. This wheel C constitutes one of the sun wheels of the gear and may be conveniently referred to as the first driving sun wheel. A toothed wheel D of larger diameter than the wheel C is mounted on one end of a sleeve D' carried loosely on the shaft C'. On the other end of the sleeve D' is a member D² so formed as to serve the double purpose of a brake member and a clutch member which is adapted to engage the clutch member A² for driving purposes. The wheel D may be referred to as the second driving sun wheel.

Figure 1:
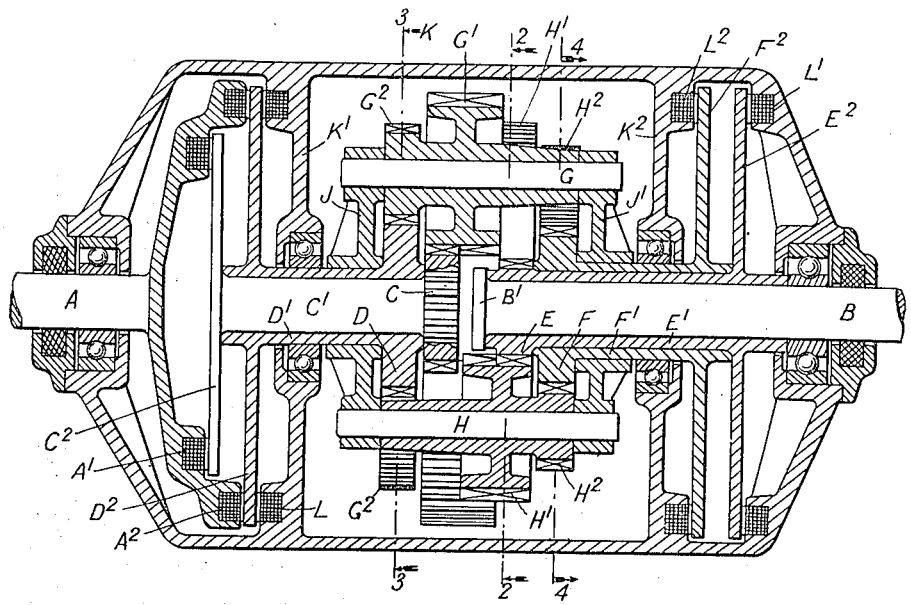

Toward the end of the driven shaft B is a toothed wheel E which may be of the same size as the wheel C or may differ therefrom in size being as shown in Fig. 1 of smaller diameter than the wheel C. The wheel E is mounted on one end of a sleeve E' loosely carried on the driving shaft B. At the opposite end of the sleeve E' is a brake member E². A toothed wheel F of larger diameter than the wheel E is mounted on one end of a sleeve F' loosely carried on the sleeve E'. At the other end of the sleeve F' is a brake member F². The wheel F may be of the same diameter as the wheel D or as shown may differ therefrom in size. It will thus be seen that of the four sun wheels with which the gear is provided two of these namely the wheels C and D can be separately driven and the latter can also have a brake applied to it so as to prevent it from rotating, the other two wheels E and F can be left free or severally held by brakes against rotation no means being provided for directly driving them.

Figure 2:
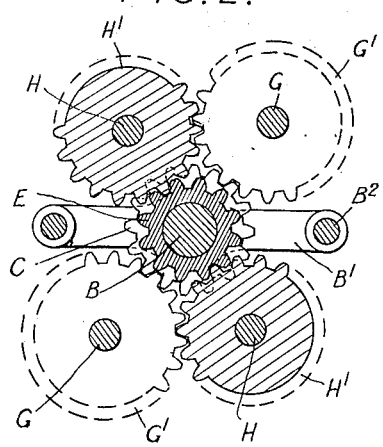
Fig. 2 is a diagrammatic transverse section on the line 2—2 of Fig. 1 looking in the direction indicated by the arrows and illustrating the two pairs of planetary members preferably employed and how the wheels of these members gear with each other and with the sun wheels.
Figure 3:
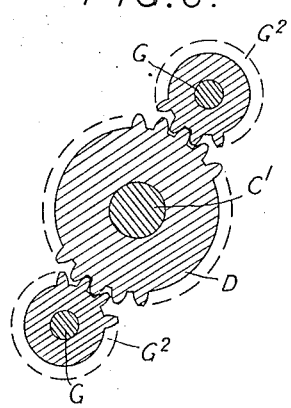
Fig. 3 is a diagrammatic transverse section on the line 3—3 of Fig. 1 showing only one pair of planetary members and the sun wheel with which they engage.
Figure 4:
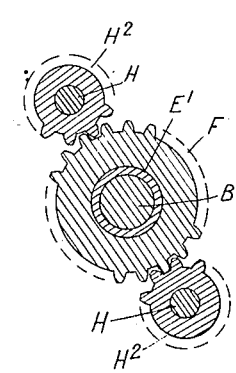
Fig. 4 is a diagrammatic transverse section on the line 4—4 of Fig. 1 showing the other pair of planetary members only and how the wheels in these members gear with one of the sun wheels

One planetary member is comprised by a spindle G on which are loosely mounted two integral spur wheels G' and G². The other planetary member is comprised by a spindle H on which are loosely mounted two integral spur wheels H' H². The ends of the spindles G and H are carried by two members J and J' which are respectively supported if desired with ball or roller bearings interposed on the sleeves D' and F'. The planetary members are connected to the driven shaft B by a spider or cross piece B' mounted on the end of the driven shaft B. The two portions of this cross-piece B' pass outwardly between the planet wheels as shown in Fig. 2 and at their ends engage rods B² which are firmly attached at their ends to the end members or carriers J and J' of the planetary system. Thus rotary motion imparted to the planetary members about the gear axis is communicated to the driven shaft B.

For convenience each planetary member G' G² and H' H² is duplicated the pairs of members being oppositely disposed about the gear axis as shown in Fig. 2. The planet wheels G' and H' are of extra breadth and gear together over approximately one half of their width in substantially the plane of the cross-piece B'. The other half of the width of the planet wheel G' gears with the first driving sun wheel C while the other half of the planet wheel H' gears with the sun wheel E. The smaller planet wheel G² gears with the second driving sun wheel D while the smaller planet wheel H² gears with the sun wheel F.

In the form of the gear illustrated in Fig. 1 the planet wheels G' and G² each differ in diameter from the planet wheels H' H² and consequently all four sun wheels C, D, E and F are of different diameters. In some cases however, it may be desirable and convenient to arrange that the four sun wheels are of only two different sizes that is to say they form two pairs of wheels, the wheels C and E being similar and constituting one pair while the wheels D and F constitute another pair. The planet members can then be made similar, that is to say, the larger planet wheels G' and H' will constitute a pair and the smaller planet wheels G² and H² will constitute a second pair. When thus made some simplification will be effected in the manufacture of the wheels but on the other hand the speed ratios which are most desirable may not then be obtainable. Hence a departure from this symmetrical arrangement may be necessary as in the construction illustrated in order to enable certain definite speed ratios to be provided.

A fixed casing K incloses the whole gear together with the clutch and brake members. This casing is provided with partitions K' and K² which divide the interior of the casing into three compartments in the center one of which lie all the gear wheels. In that compartment which is on the driving shaft side of the gear compartment are disposed the clutch members A' A², C² and D² and on the partition K' is arranged a fixed brake member L adapted to engage the rotatable member D² which serves the double purpose of a clutch member and a brake member. In the compartment at the other side or end of the gear wheels lie the two rotatable brake members E² and F² and corresponding fixed brake members L' and L² are arranged in this compartment, the brake member L' being disposed on the end wall of the casing K while the brake member L² is mounted on the partition K². The partition K' extends inwardly to the sleeve D' a ball or roller bearing being conveniently here disposed. Similarly the partition K² extends inwardly to the sleeve F' with a ball or like bearing arranged here also. By thus dividing up the casing K it is possible to so isolate the gear wheels that fragments of metal which may be worn off the clutch and brake members and other foreign matter which may be present in the end compartments is prevented from entering the central gear compartment and by getting into the oil which surrounds the gear wheels cause risk of damage to the gears. It also becomes possible to supply oil to or run dry the clutch and brake members which are arranged in the separate end compartments. This separation of the clutch and brake members from the gear wheels is particularly advantageous where the clutches and brakes are as illustrated in this construction of the electromagnetic type but it is also useful where mechanically operated clutches and brakes are employed.

The various speeds are obtained in the following manner in a gear thus constructed. It will be understood that in each case only those clutch and brake members which are indicated are operative the other clutch and brake members being out of action.

For the first or lowest speed the first sun wheel C is driven by engaging the clutch members A', C² while the wheel F is held against rotation by engagement of the brake members F² and L².

For the second speed the first sun wheel C is again driven but in this case the wheel E is held against rotation by engaging the brake members E² an L'.

For the third speed the wheel D is driven by engaging the clutch members A², D² and the wheel E is held against rotation. Alternatively the wheel D is driven while the wheel F is fixed.

For the fourth speed the clutch members controlling both the wheels C and D are engaged so that both these wheels are driven with the result that the whole gear is locked and the drive is transmitted direct from the driving shaft A to the driven shaft B. No relative rotation of any of the wheels of the gear then occurs.

In order to obtain the reverse the first sun wheel C is driven and the second sun wheel D is held against rotation by applying the brake L to the member D².

It will be noted that by reason of the alternative methods above mentioned for obtaining the third speed it is practically possible with this gear to obtain five different speeds in the forward direction if so desired.

Turning now to the construction shown in Figs. 5 and 6 these show a modified form of the gear which also provides four or five speeds in a forward direction and a reverse. The main differences between the gear here shown and that described with reference to Fig. 1 are that in this case one of the essential planetary members is composed of a single wheel H', while the sun wheel F assumes the form of an internally toothed ring which gears with the smaller planetary wheel G² of the other planetary member which comprises two integral wheels G' and G² of different sizes as before. The single planetary wheel H' gears with the sun wheel E and also with the larger wheel G' of the other planetary member. The latter as before gears with the first driving sun wheel C. The smaller planet wheel G² not only gears with the toothed ring F but also as before with the second driving sun wheel D.

The toothed ring F is mounted on a cage or casing F³ which incloses all the gear wheels. This casing F³ is carried at one side of the gear by the sleeve F' on the end of which is disposed the brake drum F² while at the other side of the gear the casing is carried by a sleeve F⁴ which runs loosely on the sleeve D'. The partition K' of the outer casing K here extends inwardly to the sleeve F⁴ with a ball or roller bearing interposed.

This form of the gear is shown as being controlled by mechanical clutches and brakes the construction and arrangement of which is set forth by way of example as other constructions and arrangements may be adopted.

The clutches as illustrated are of the cone type but they may be plate clutches or of the expanding type. The cone clutch member C² is carried on the end of the shaft C' so that it can slide axially thereon. The clutch member D² is similarly carried on the sleeve D'. Between the hubs of these clutch members is disposed a coiled spring M which presses equally in opposite directions the two cones against the hollow conical clutch members A' A² which are mounted on the driving shaft A. Between that end of the spring M which is directed toward the clutch C² and the hub of this clutch member is a loose collar N connected by rods N' disposed parallel to the gear axis with a loose collar N² disposed on an axially sliding sleeve O mounted on the sleeve D'. The rods N' pass freely through openings in the clutch member D². On a rockshaft P is mounted a lever P' which engages the sleeve O in some convenient manner so that when the shaft P is rocked the sleeve O can be moved axially. When thus moved to the right as shown in Fig. 7 the spring M will be compressed and the clutch member $C^2$ disengaged from the clutch member A' by reason of the pull exerted through the rods N'. When the rockshaft P is freed the spring M will cause the clutch members $C^2$ and A' to engage. A second rockshaft Q carries a lever Q' which engages in some convenient manner a sleeve R mounted so that it can slide axially on the sleeve D'. This sleeve R actually lies between the sleeve O and the sleeve D' and the end of the sleeve R bears against the hub of the clutch member $D^2$. When the shaft Q is rocked the sleeve R will be moved toward the left as shown in the drawing and the spring M will consequently be compressed as the clutch member $D^2$ is moved out of engagement with the clutch member $A^2$. On releasing the rockshaft Q the clutch members $A^2$ and $D^2$ will again come into engagement. By means of this clutch mechanism it is possible to engage or hold out of engagement the two clutch members $C^2$ and $D^2$ either separately or simultaneously. This method of arranging and operating the clutches is similar to certain known clutch constructions and as mentioned is illustrated by way of example to show how mechanically operated clutches may be employed for controlling the improved gears in order to effect the necessary speed variations.

The mechanically operated brakes employed in this case may be of any suitable type but as illustrated they comprise a drum such as $D^3$ mounted on the sleeve D', a drum $E^2$ mounted on the sleeve E' and a drum $F^2$ mounted on the sleeve F'. To each of these drums may be applied in some convenient manner a contracting brake band. Brakes of the expanding or other type may however be employed if desired. These brakes and clutches are conveniently operated by pedals levers or other suitable mechanism so arranged as to enable the clutches and brakes to be manipulated in the combinations necessary to effect the desired speed changes.

It will be noted that in this form of the gear the sun wheels C and E are both of the same diameter while the planet wheels H' and G' are also a pair being of the same diameter. If other speed ratios are desired the wheels C and E need not be a pair but may differ in size as also the wheels G' and H'.

The several speeds in this construction are obtained in the following manner:—

For the first speed the first sun wheel C is driven through the clutch members A' $C^2$ and the toothed ring F is held by applying the brake to the drum $F^2$.

For the second speed the first sun wheel C is again driven while the twin sun wheel E is held by the brake on the drum $E^2$.

For the third speed the second sun wheel D is driven by the clutch members $A^2$ $D^2$ and the sun wheel E is again fixed. Alternatively a third speed may be obtained by driving the sun wheel D and fixing the toothed ring F.

For the fourth speed by which a direct drive is obtained both sun wheels C and D are driven through their respective clutch members no brakes being in operation. All the gear wheels are then locked and rotate as a whole without relative rotation.

To obtain the reverse the first sun wheel C is driven and the second sun wheel D is fixed by the brake acting on the drum $D^3$.

It will be noted that in this gear also it is possible to obtain five speeds in the forward direction by reason of the alternative methods of obtaining the third speed.

In each of the constructions of gear in accordance with this invention a differential action is obtained in transmitting the drive from the driving shaft A to the driven shaft B by reason of the mutual engagement of the wheels G' and H' of the two essential planetary members. This differential action is only absent in the case of the alternative method of obtaining the third speed in the construction illustrated in Fig. 5 where the wheel D is driven and the toothed ring F is fixed. A single epicyclic drive is then communicated through the planetary member G' $G^2$ to the driven shaft B without the planetary wheel H' being operative in this transmission.

The constructions more particularly illustrated and described above show the arrangements and relative sizes of the gear wheels which are preferred in putting the invention into practice but without departing from the spirit of the invention the relative sizes of the wheels may be varied and such variation may necessitate certain variations in the arrangement of the wheels. By varying the dimensions of the several wheels it becomes possible to obtain such speed ratios as may be desirable.

It will be understood that in place of the broad wheels with which the planetary members are provided as more particularly described above and shown in the drawings, in some cases it may be desirable to employ two wheels of less width and formed integral.

If as may be the case it is desirable to separate all the brake members from the clutches this may be effected in either of the constructions of gear described by mere duplication of the sun wheel D and of the planet pinion $C^2$ with which it gears. Thus for example in the construction illustrated in Fig. 1 a wheel identical with the wheel D mounted on a sleeve such as D' and provided with a brake member such as D² would be arranged upon the driven shaft B. This extra sun wheel might be disposed between the wheels E and F with its sleeve between the sleeves E' and F'. The brake member of the extra wheel would lie between the brake members E² and F² the corresponding fixed brake member L being suitably placed on the end of the casing K. The necessary additional planet pinion with which the extra sun wheel must engage would be arranged on the spindle G according to the position of the extra sun wheel and at the side of the planet wheel C' opposite to that on which lies the pinion G² all three wheels being formed integral. Again in the construction shown in Fig. 5 and duplicate of the sun wheel D would be arranged at one side of the wheel E on the driven shaft B and the brake drum D³ of this wheel would be disposed between the brake drums E² and F². As before a duplicate of the planet pinion G² would be necessary this extra pinion being arranged as already described. The duplication of the toothed ring F is not necessary but may be deemed desirable.

The clutches and brakes whether of the electromagnetic or mechanical type may be controlled in various ways as found convenient. In some cases it may be desirable to construct and arrange the clutches so that they are mechanically operated while the brakes are of the electromagnetic type or conversely electromagnetic clutches may be used in combination with mechanically operated brakes.

As already mentioned the drawings illustrate the constructions generally in a diagrammatic manner. It may be remarked however that in Fig. 5 is shown by way of example one method of constructing the cage or casing F³ which carries the toothed ring F so as to permit of assembling the parts. The same figure also shows a method of constructing the outer casing K with the partitions K' and K² so as to permit of the mechanism within it being assembled.

What I claim as my invention and desire to secure by Letters Patent is:—

1. In an epicyclic variable speed gear of the spur wheel type with differential action, the combinatiotn of a driving shaft, two clutch members mounted on the driving shaft, a driven shaft coaxial with the driving shaft, two planetary members, having wheels, connected to the driven shaft, a wheel of one planetary member gearing with one of the wheels of the other member, a set of separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

2. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, all the wheels of the two members being of not less than two and not more than four different sizes, a set of separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

3. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, a set of separate wheels of not less than two and not more than four different sizes, all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

4. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, and all the wheels of the two members being of not less than two and not more than four different sizes, a set of separate wheels, of not less than two and not more than four different sizes, all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

5. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member and the number of wheels in the two members taken together being not less than three and not more than four, a set of separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

6. In an epicyclic variable speed gear of the spur wheel type with differential action, the combination of a driving shaft, two clutch members mounted on the driving shaft, a driven shaft coaxial with the driving shaft, two planetary members, having wheels connected to the driven shaft, a wheel of one planetary member gearing with one of the wheels of the other member, a set of four separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

7. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, the number of wheels in the two members taken together being not less than three and not more than four, a set of four separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

8. In an epicyclic variable speed gear of the spur wheel type with differential action, the combination of a driving shaft, two clutch members mounted on the driving shaft, a driven shaft coaxial with the driving shaft, two planetary members, having wheels connected to the driven shaft, a wheel of one planetary member gearing with one of the wheels of the other member, the number of wheels in the two members taken together being not less than three and not more than four and of at least two different sizes, a set of separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

9. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member and all the wheels of the two members being of not less than two and not more than four different sizes, a set of four separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

10. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member and the number of wheels in the two members taken together being not less than three and not more than four, a set of separate wheels of not less than two and not more than four different sizes all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

11. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, a set of four separate wheels, of at least two different sizes, all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels, against rotation as set forth.

12. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, the number of wheels in the two members taken together being not less than three and not more than four and of at least two different sizes, a set of separate wheels of not less than two and not more than four different sizes all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

13. In an epicyclic variable speed gear of the spur wheel type with differential action, the combination of a driving shaft, two clutch members mounted on the driving shaft, a driven shaft coaxial with the driving shaft, two planetary members, having wheels, connected to the driving shaft, a wheel of one planetary member gearing with one of the wheels of the other member, all the wheels of the two members being of not less than two and not more than four different sizes, a set of four separate wheels of at least two different sizes all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

14. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, the number of wheels in the two members taken together being not less than three and not more than four and of at least two different sizes, a set of four separate wheels of at least two different sizes all mounted co-axially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and a plurality of brakes operative to separately hold a plurality of the said wheels against rotation as set forth.

15. In an epicyclic variable speed gear of the spur wheel type with differential action, the combination of a driving shaft, a driven shaft coaxial with the driving shaft, two planetary members having wheels, connected to the driven shaft, a wheel of one planetary member gearing with one of the wheels of the other member, a set of separate wheels all mounted coaxially with but separate from the driving and driven shafts, certain of these wheels gearing with one planetary member and certain of them gearing with the wheels of the other planetary member, means for separately coupling certain of the said wheels to the driving shaft, and means for separately holding certain of the said wheels against rotation as set forth.

16. In an epicyclic variable speed gear of the spur wheel type with differential action, the combination of a driving shaft, a driven shaft coaxial with the driving shaft, two planetary members having wheels, connected to the driven shaft, a wheel of one planetary member gearing with one of the wheels of the other member, a set of four separate wheels all mounted coaxially with but separate from the driving and driven shafts, certain of these wheels gearing with one planetary member and certain of them gearing with the wheels of the other planetary member, means for coupling one of the said wheels to the driving shaft, means for separately holding two of the said wheels against rotation, and means by which one of these wheels can be either coupled to the driving shaft or held against rotation as set forth.

17. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, a set of separate wheels all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, and three brakes operative to separately hold against rotation three of the said wheels as set forth.

18. In an epicyclic variable speed gear of the spur wheel type with differential action, the combination of a driving shaft, a driven shaft coaxial with the driving shaft, two planetary members having wheels, connected to the driven shaft and each comprising two integral wheels of different sizes, a wheel of one planetary member gearing with one of the wheels of the other member, a set of separate sun wheels all mounted coaxially with but separate from the driving and driven shafts, certain of these sun wheels gearing with the wheels of one planetary member and certain of them gearing with the wheels of the other planetary member, means for separately coupling certain of these sun wheels to the driving shaft, and means for separately holding certain of these sun wheels against rotation as set forth.

19. In an epicyclic variable speed gear of the spur wheel type with differential action, the combination of a driving shaft, a driven shaft coaxial with the driving shaft, two planetary members, having wheels, connected to the driven shaft and each comprising two integral wheels of different sizes, the larger wheel of one member gearing with the larger wheel of the other member, a set of separate sun wheels all mounted coaxially with but separate from the driving and driven shafts, certain of these sun wheels gearing with the wheels of one planetary member and certain of them gearing with the wheels of the other planetary member, means for separately coupling certain of these sun wheels to the driving shaft, and means for separately holding certain of these sun wheels against rotation as set forth.

20. In an epicyclic variable speed gear of the spur wheel type with differential action, the combination of a driving shaft, a driven shaft coaxial with the driving shaft, two planetary members, having wheels, connected to the driven shaft, a wheel of one planetary member gearing with one of the wheels of the other member, a set of separate wheels all mounted coaxially with but separate from the driving and driven shafts and arranged in two groups, one group gearing with one planetary member and the other group gearing with the other planetary member, means for separately coupling certain of the said wheels to the driving shaft, and means for separately holding certain of the said wheels against rotation as set forth.

21. In an epicyclic variable speed gear of the spur wheel type with differential action, the combination of a driving shaft, a driven shaft coaxial with the driving shaft, two planetary members, having wheels, connected to the driven shaft, a wheel of one planetary member gearing with one of the wheels of the other member, a set of separate wheels all mounted coaxially with but separate from the driving and driven shafts and grouped on either side of the connection between the end of the driven shaft and the planetary members, certain of these wheels gearing with one planetary member and certain of them gearing with the wheels of the other planetary member, means for separately coupling certain of the said wheels to the driving shaft, and means for separately holding certain of the said wheels against rotation as set forth.

22. In an epicyclic variable speed gear of the spur wheel type with differential action, the combination of a driving shaft, a driven shaft co-axial with the driving shaft, two planetary members, having wheels, connected to the driven shaft and each comprising two integral wheels of different sizes, the larger wheel of one member gearing with the larger wheel of the other member, a set of four separate sun wheels all mounted coaxially with but separate from the driving and driven shafts, certain of these sun wheels gearing with the wheels of one planetary member and certain of them gearing with the wheels of the other planetary member, means for coupling one of the sun wheels to the driving shaft, means for separately holding two of the sun wheels against rotation, and means by which one of the sun wheels can be either coupled to the driving shaft or held against rotation as set forth.

23. In an epicyclic variable speed gear of the spur wheel type with differential action, the combination of a driving shaft, a driven shaft co-axial with the driving shaft, two planetary members, having wheels, connected to the driven shaft, a wheel of one planetary member gearing with one of the wheels of the other member, a set of four separate wheels all mounted co-axially with but separate from the driving and driven shafts and arranged in two groups, one group gearing with one planetary member and the other group gearing with the other planetary member, means for coupling one of the said wheels to the driving shaft, means for separately holding two of the said wheels against rotation, and means by which one of these wheels can be either coupled to the driving shaft or held against rotation as set forth.

24. In an epicyclic variable speed gear of the spur wheel type with differential action, the combination of a driving shaft, a driven shaft coaxial with the driving shaft, two planetary members, having wheels, connected to the driven shaft, a wheel of one planetary member gearing with one of the wheels of the other member, a set of four separate wheels all mounted co-axially with but separate from the driving and driven shafts and grouped on either side of the connection between the end of the driven shaft and the planetary members, certain of these wheels gearing with one planetary member and certain of them gearing with the wheels of the other planetary member, means for coupling one of the said wheels to the driving shaft, means for separately holding two of the said wheels against rotation, and means by which one of these wheels can be either coupled to the driving shaft or held against rotation as set forth.

25. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft and each comprising two integral wheels of different sizes, the larger wheel of one member gearing with the larger wheel of the other member, a set of four separate sun wheels all mounted coaxially with but separate from the driving and driven shafts, certain of these wheels gearing with the wheels of one planetary member and certain of them gearing with the wheels of the other planetary member, two clutch members corresponding to the clutch members on the driving shaft and operative to separately couple two of the sun wheels to the driving shaft, and three brakes operative to separately hold against rotation three of the sun wheels as set forth.

26. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, a set of four separate wheels mounted coaxially with but separate from the driving and driven shafts and arranged in two groups disposed on either side of the connection between the end of the driven shaft and the planetary members, the wheels in one group gearing with one planetary member and the other group gearing with the other planetary member, two clutch members corresponding to the clutch members on the driving shaft and operative to separately couple two of the said wheels to the driving shaft, and three brakes operative to separately hold against rotation three of the said wheels as set forth.

27. In an epicyclic variable speed gear of the spur wheel type with differential action, the combination of a driving shaft, two clutch members mounted on the driving shaft, a driven shaft coaxial with the driving shaft, two planetary members, having wheels, connected to the driven shaft, a wheel of one planetary member gearing with one of the wheels of the other member, all the wheels of the two members being of not less than two and not more than four different sizes, a set of four separate wheels, of at least two different sizes, all mounted coaxially with but separate from the driving and driven shafts, certain of these wheels gearing with one planetary member and certain of them gearing with the wheels of the other planetary member, two clutch members corresponding to the clutch members on the driving shaft and operative to separately couple two of the said wheels to the driving shaft, a brake operative to hold against rotation one of the said wheels which can be clutched to the driving shaft, and two brakes operative to separately hold against rotation those two of the said wheels which cannot be clutched to the driving shaft as set forth.

28. In an epicyclic variable speed gear of the spur wheel type with differential action, the combination with a driving shaft, two clutch members mounted on the driving shaft, a driven shaft coaxial with the driving shaft, two planetary members, having wheels connected to the driven shaft, a wheel of one planetary member, gearing with one of the wheels of the other member all the wheels of the two members being of not less than two and not more than four different sizes, a set of four separate wheels, of at least two different sizes, all mounted coaxially with but separate from the driving and driven shafts and arranged in two groups, one group gearing with one planetary member and the other group gearing with the other planetary member, two clutch members, corresponding to the clutch members on the driving shaft, operative to separately couple two of the said wheels to the driving shaft, a brake operative to hold against rotation one of the said wheels which can be clutched to the driving shaft, and two brakes operative to separately hold those two of the said wheels which cannot be clutched to the driving shaft as set forth.

29. In an epicyclic variable speed gear of the spur wheel type with differential action, the combination with a driving shaft, two clutch members mounted on the driving shaft, a driven shaft coaxial with the driving shaft, two planetary members, having wheels, connected to the driven shaft and each comprising two integral wheels of different sizes, the larger wheel of one member gearing with the larger wheel of the other member, a set of four separate sun wheels, of at least two different sizes, all mounted coaxially with but separate from the driving and driven shafts and arranged in two groups, the wheels in one group gearing with one planetary member and the wheels in the other group gearing with the other planetary member, two clutch members corresponding to the clutch members on the driving shaft operative to separately couple two of the said sun wheels to the driving shaft, a brake operative to hold against rotation one of the said sun wheels which can be clutched to the driving shaft, and two brakes operative to separately hold those two of the said sun wheels which cannot be clutched to the driving shaft as set forth.

30. In an epicyclic variable speed gear of the spur wheel type with differential action the combination of a driving shaft, two clutch members mounted on the driving shaft, a driven shaft coaxial with the driving shaft, two planetary members, having wheels, connected to the driven shaft and each comprising two integral wheels of different sizes, the larger wheel of one member gearing with the larger wheel of the other member, a set of four separate sun wheels mounted coaxially with but separate from the driving and driven shafts and arranged in groups disposed on either side of the connection between the end of the driven shaft and the planetary members, the two wheels forming one group gearing with the two wheels of one planetary member and the two wheels forming the other group gearing with the two wheels of the other planetary member, two clutch members corresponding to the clutch members on the driving shaft and operative to separately couple to the driving shaft two of the sun wheels forming one of the said groups, a brake operative to hold against rotation one of the sun wheels in this group, and two brakes operative to separately hold against rotation the two sun wheels forming the other group as set forth.

31. In an epicyclic variable speed gear of the spur wheel type with differential action, the combination of a driving shaft, a driven shaft coaxial with the driving shaft, two planetary members, having wheels, connected to the driven shaft a wheel of one planetary member gearing with one of the wheels of the other member, a set of four separate wheels all mounted coaxially with but separate from the driving and driven shafts certain of these wheels gearing with one planetary member and certain of them gearing with the wheels of the other planetary member, a clutch for coupling one of the said wheels to the driving shaft, brakes for separately holding two of the said wheels against rotation, a clutch and a brake by means of which one of these wheels can be either coupled to the driving shaft or held against rotation, a casing inclosing the gear wheels the clutches and the brakes, and partitions in this casing which so divide it into compartments that the clutches and brakes are separated from the gear wheels as set forth.

In testimony whereof I have signed my name to this specification in the presence of two subscribing witnesses.

ARTHUR JOHN ROWLEDGE.

Witnesses:
 BERTRAM EDWARD DUNBAR KILBURN,
 ARCHIBALD JOHN FRENCH.